Figure 1:
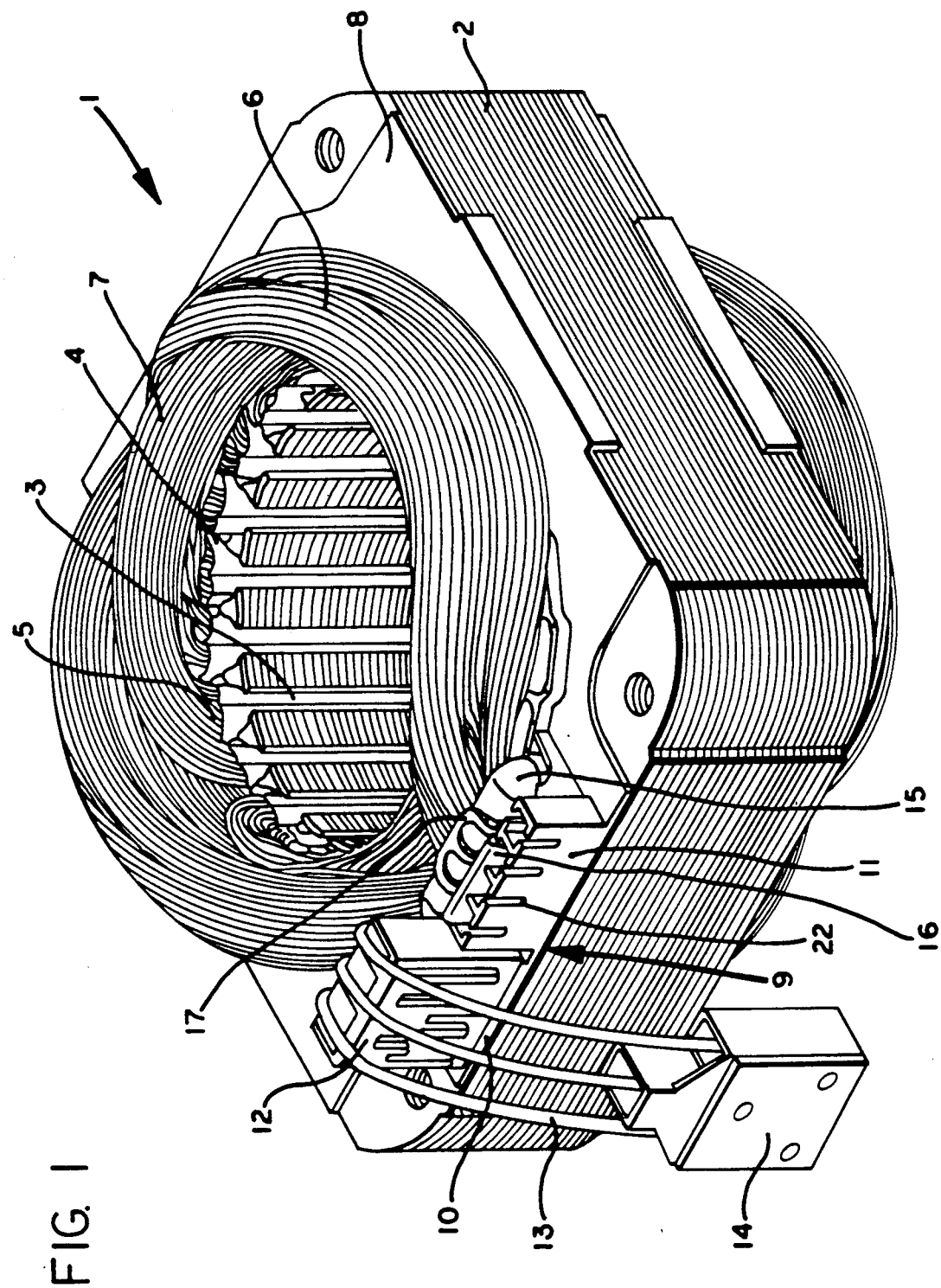

United States Patent [19]

Borgen et al.

[11] Patent Number: 5,204,566
[45] Date of Patent: Apr. 20, 1993

[54] ELECTRICAL MACHINE

[75] Inventors: Sverre Martin Borgen; Poul Petersen, both of Nordborg, Denmark; Heinz O. Lassen, Flensburg, Fed. Rep. of Germany

[73] Assignee: Danfoss A/S, Nordborg, Denmark

[21] Appl. No.: 798,227

[22] Filed: Nov. 25, 1991

[30] Foreign Application Priority Data

Nov. 28, 1990 [DE] Fed. Rep. of Germany ....... 4037753

[51] Int. Cl.$^5$ ............................................. H02K 11/00
[52] U.S. Cl. ........................................ 310/71; 310/216
[58] Field of Search ............... 310/71, 216, 218, 68 R, 310/179, 182

[56] References Cited

U.S. PATENT DOCUMENTS

| 3,979,615 | 9/1976 | Neff | 310/71 |
|---|---|---|---|
| 4,038,573 | 7/1977 | Hillyer et al. | 310/71 |
| 4,177,397 | 12/1979 | Lill | 310/71 |
| 4,181,393 | 1/1980 | Lill | 310/71 |
| 4,340,829 | 7/1982 | McCoy | 310/71 |
| 4,656,378 | 4/1987 | Atherton et al. | 310/71 |

Primary Examiner—Steven L. Stephan
Assistant Examiner—Matthew Nguyen
Attorney, Agent, or Firm—Wayne B. Easton

[57] ABSTRACT

The apparatus includes a laminated core that has frontal end faces and slots with a winding extending in the slots. An electrical insulating end plate is provided adjacent at each frontal end face and adjacent to the winding heads of the winding. At least one of the end plates has a connecting box with a plurality of clamps for the ends of the windings and the terminal of a motor protection device.

14 Claims, 4 Drawing Sheets

ELECTRICAL MACHINE

The invention relates to an electrical machine with a laminated core carrying a winding, the laminated core having slots, there being arranged at each front end face of the laminated core an electrically insulating end plate adjacent which lie winding heads of the windings.

A machine of this kind is known from DE 37 12 226 A1. Such machines are used, for example, as motors in hermetically-encapsulated refrigerating compressors, where compressor and motor are suspended in a capsule with the aid of springs. With compressors of this kind, the electrical power is supplied to the motor by way of flexible leads, which are secured at one end to a terminal in the capsule and at the other end to the motor windings. The connection with the motor windings is effected, for example, by means of clamp connections in sleeve-like connecting members which are arranged in an insulated manner between the windings, or with the help of a connecting box, which is pushed over a foot into the slots of the laminated core, as is known, for example, from DE 27 36 831 C2 or US 4 004 169.

In that case, however, it is a disadvantage that the ends of the winding wires, that is to say, the winding ends, have to have a certain excess length, so that the connecting box or the sleeve-like connecting members can still be manipulated. These excess lengths must not remain freely movable, but must be accommodated in the region of the winding head. Since wire enamel is used predominantly for the windings, there is a risk that the enamel insulation will become damaged by abrasion, as the result of which shortcircuits can occur, which can impede quite decisively the ability of the motor to function. Fastening the winding ends is time-consuming and tedious.

The invention is based on the problem of producing an electrical machine which has an improved reliability combined with a simplified manufacture.

This problem is solved in the case of an electrical machine of the kind mentioned in the introduction in that at least one of the end plates has a connecting box into which the ends of the windings and electrical connecting wires are introduced.

The connecting box is therefore fixedly joined to the associated end plate. The winding ends are introduced into the connecting box after fabrication of the winding. Because the connecting box has a defined position in relation to the windings, this has the advantage that the winding ends are exactly the required length. The winding ends are no longer freely movable. The risk of damage to the enamel insulation is thereby substantially reduced.

It is preferable in this connection for the connecting box to be formed in one piece with the end plate. For example, the connecting box and end plate can easily be manufactured together as an injection-moulded part. This reduces manufacturing costs because the end plate no longer needs to be joined to the connecting box.

The connecting box preferably has one clamp for each winding end, the clamp holding the winding end after its introduction. During manufacture the winding end therefore needs merely to be introduced into the connecting box and cut off. In the case of self-locking clamps, no further steps are necessary. With other types of clamp it may still be necessary, for example, to initiate the clamping force, for example by actuating a spring. The connection between the winding ends and the connecting wires is then produced by way of the connecting box, that is to say, the connecting wires can be introduced in the same or a similar manner into the connecting box. Manufacture is thereby quite considerably simplified. The connection can be effected, for example, by a conductor arranged in the connecting box which connects the two clamps to one another, or by bringing the connecting wires into direct contact with the clamp receiving the relevant winding end. The latter option can also be effected, for example, by means of a plug.

The connecting box preferably has at least one slot-like opening into which the winding end can be introduced at right angles to its length. Tedious threading-in operations are thereby avoided. The winding end can simply be inserted into the slot. When it is pulled against the bottom or a side wall of the slot it automatically comes into contact with the clamp allocated to it, where it is held. Manufacture can thus be carried out very quickly without excess lengths of the winding ends being formed.

It is preferable in this connection for the clamps to comprise insulation-piercing contacts. The insulation-piercing contacts pierce the insulation of the winding ends and allow contact with the core of the winding wires.

In a preferred embodiment, the end plates enclose all slots of the laminated core. In such an arrangement, the end plates have to be positioned prior to the winding being introduced into the slots. This makes for a very secure fastening. This embodiment can be used advantageously in conjunction with adhesive enamelled wire since it is not necessary in that case to secure the winding heads with bindings. The end plates may in that case have virtually the same slot shape as the individual laminations of the laminated core. It is not necessary, however, for the teeth between the slots to be completely covered.

In a further preferred embodiment, provision is made for the end plates to enclose some of the slots of the laminated core. In that case, the end plates can be mounted after the windings have been introduced into the laminated core and the coil ends have been shaped and combined into their final form. Because the end plate covers over only some of the slots of the laminated core, it can then be pushed in laterally, that is to say, parallel to the laminations of the laminated core. Once the end plates have been pushed in, the winding ends can be introduced into the connecting box.

In that connection it is preferable for the end plates to enclose 40 to 60% of the slots of the laminated core. Something like approximately half of the slots is sufficient for fixing the end plates in the required position.

It is also preferable for the end plates to be capable of snap-locking at the winding heads. Two advantages are gained by this. Firstly, the end plates are then fixed in relation to the windings. The lengths of the winding ends that are formed during manufacture then also remain unchanged in operation. Secondly, this option allows a very rational manufacture. The end plates can simply be inserted and then they snap in, without additional fastening measures being necessary.

Advantageously, the end plates are essentially in the shape of a U with two substantially parallel arms and a base joining the arms, areas of reduced section being provided between the arms and the base. For manufacture, the arms are bent outwards, which they are able to do easily because of the areas of reduced section. The end plate is then brought parallel to the base up to the windings. If the arms are now released, they spring inwards and engage two opposite sides of the windings. Because the base projects at least partially into the regions between the individual slots, that is to say, at least partially covers the teeth, a movement parallel to the base is impossible. A movement of the end plate at right angles to the base is prevented by the two arms, which likewise enter at least partially the regions between the individual slots.

In a further preferred embodiment, a motor protection device is provided, by means of which at least one winding end is connected to the connecting box, a retaining arm being arranged in the connecting box which holds the motor protection device in thermal contact with the laminated core and/or the winding or the winding head. A motor protection device of this kind is known, for example, from US-PS 3 573 697. If the temperature in the winding or the winding head and/or in the laminated core rises above a predetermined degree, which may be the case for example if the motor is subjected to heavy mechanical stress, the motor protection device interrupts the flow of current through the corresponding winding. This avoids the motor being destroyed by overheating.

In this connection it is preferable for the motor protection device to be arranged between the connecting box and the winding head. The connecting box can therefore apply a part of the holding force for the motor protection device.

Advantageously, a terminal of the motor protection device and a winding end are introduced into separate clamps of the connecting box, the clamps being connected to one another by a short-circuiting link. Manufacture is simplified quite considerably by this measure. The winding end merely requires to be placed in the associated clamp. The same applies to the corresponding terminal of the motor protection device. Both terminals are fixed in this manner. The electrical connection is effected virtually without additional effort by means of the short-circuiting link, which at the same time presses the motor protection device against the winding.

In that connection it is preferable for a terminal of each winding to be connected by way of the short-circuiting link to the motor protection device. An electrical machine of the kind mentioned in the introduction generally has several windings, for example a main and an auxiliary winding, the auxiliary winding serving in particular for starting up the machine. Both windings can have a common terminal at one winding end, if it is possible to ensure that the other winding ends are separately supplied. The motor protection device can advantageously be arranged at this common terminal. This guarantees that when the thermal stress on the machine becomes too great both windings are disconnected simultaneously.

The short-circuiting link and the retaining arm are preferably constructed as one part. This ensures that the machine can only be operated when the motor protection device is fixed by the retaining arm. If it is not fixed, then the short-circuiting link is also not in use. There is thus no electrical connection from the winding ends to the respective external terminals.

The connecting box advantageously has two sockets, one of which serves to receive a plug. By way of the plug the flexible leads can be connected to the winding ends. The other socket serves for the connection of the other winding ends to the motor protection device.

Figure 2:
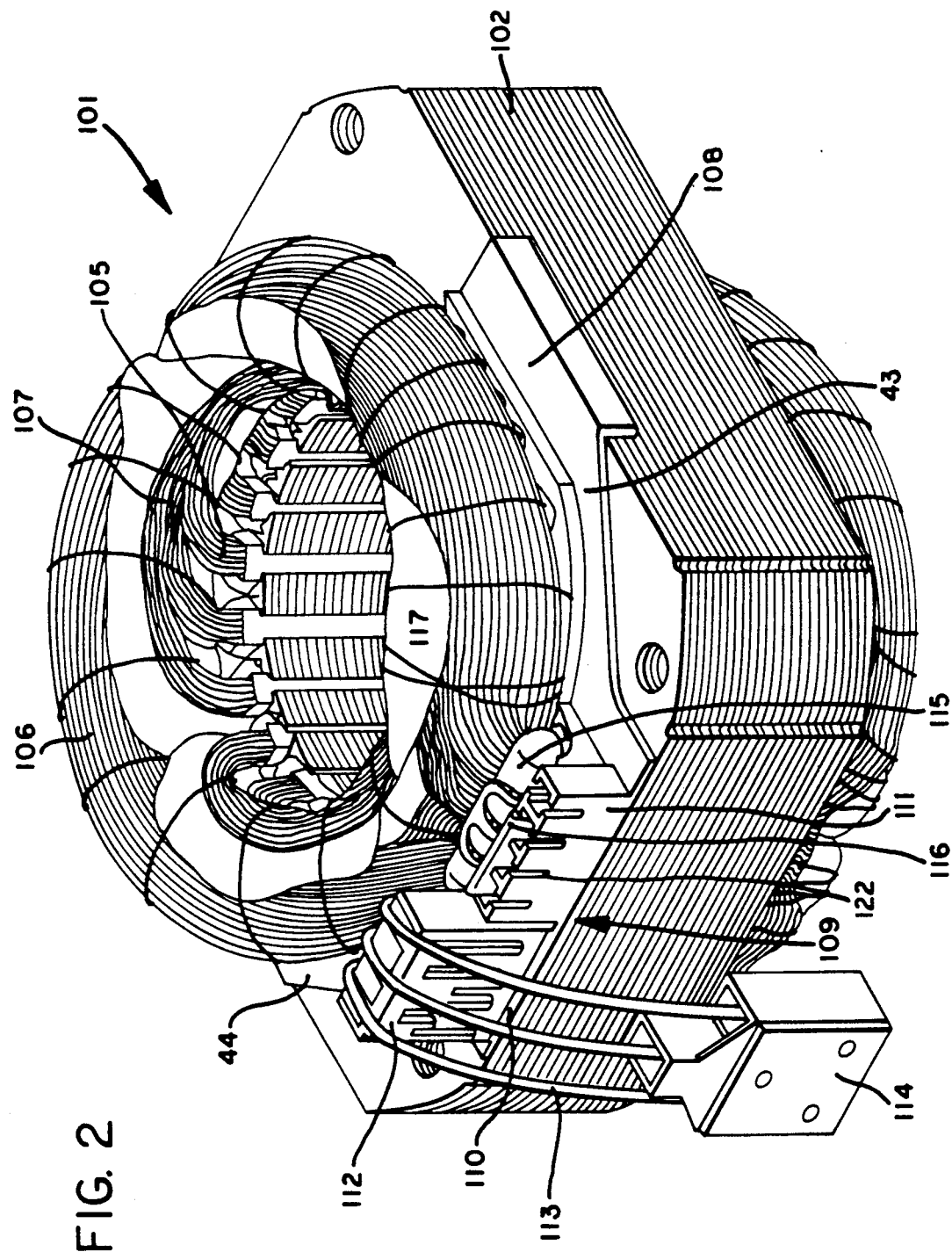
Figure 3:
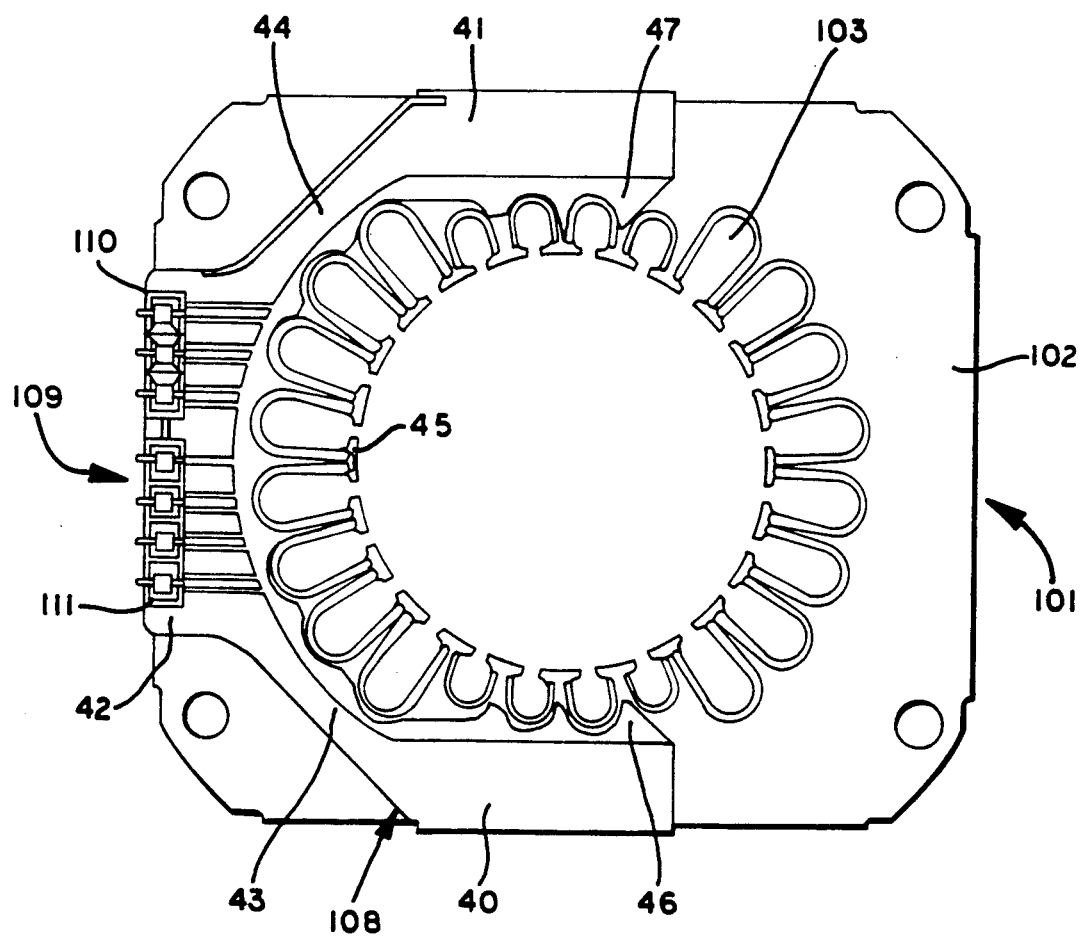
Figure 4:
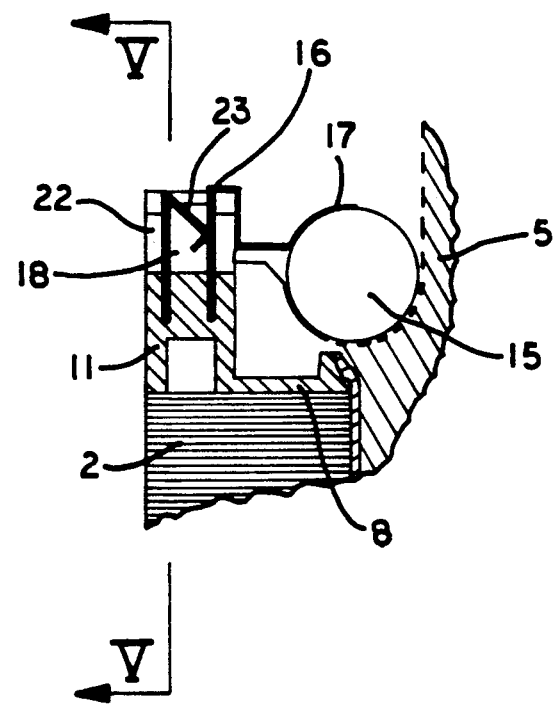
Figure 5:
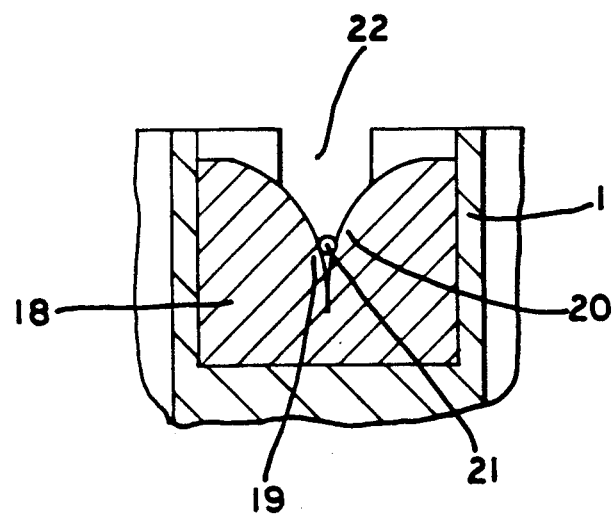

The invention is described hereinafter with reference to preferred embodiments in conjunction with the drawing. In the drawing, FIG. 1 shows a first embodiment,
FIG. 2 shows a second embodiment,
FIG. 3 shows a plan view of the top side of the laminated core shown in FIG. 2 without windings,
FIG. 4 shows a cross-section of a fragment of laminated core, winding and motor protection device, and
FIG. 5 shows a section V—V according to FIG. 4.

A stator 1 of an electrical machine has a laminated core 2 which is composed of a plurality of laminations stacked one on top of another. The laminated core has slots 3 which are sheathed with an insulating layer 4. The slots 3 receive windings 5 which are formed from enamelled wire. The enamelled wire comprises a core of electrically conductive metal and an enamel insulating layer surrounding the core. The stator illustrated has a main winding and an auxiliary winding, the auxiliary winding serving in particular for starting up the motor. The parts of the windings 5 emerging from the slots 3 are joined to one another by way of winding heads 6, 7.

At each end of the laminated core 2 there is arranged a respective end plate 8. In the embodiment shown in FIG. 1 each end plate covers virtually the entire laminated core 2 so that all the slots 3 are enclosed by the respective end plate 8. During manufacture the laminated core 2 is first of all put together, then the end plates 8 are put into position and finally the windings 5 are introduced. The winding heads 6, 7 are formed, for example, in that the individual wires in the winding ends adhere to one another.

A connecting box 9, which has two sockets 10, 11 is formed in one piece with the upper end plate 8. A plug 12 which is connected by way of flexible leads 13 to a further plug 14 is inserted into the left-hand socket 10. The plug 14 can be connected to a correspondingly formed plug connection in a housing or an enclosure, not illustrated, of a refrigerating machine. It is thus possible to mount the stator 1 flexibly in the housing, for example to suspend it with the help of springs in the housing, without the electrical connection to the motor being damaged.

In addition, a motor protection device 15 is provided, which is arranged between the right-hand socket and the laminated core 2 or the windings 5. A motor protection device of this kind can comprise, for example a bimetallic switch, as is known from US-PS 3 573 697. The thermal contact between the motor protection device and the windings 5 and the laminated core 2 is guaranteed by way of a retaining arm 17, which presses the motor protection device 15 against the windings 5, as illustrated diagrammatically in FIG. 4.

The connecting box 9 has a plurality of clamps each of which receives a winding end or a terminal of the motor protection device 15. A clamp 18 of this kind is illustrated diagrammatically in FIGS. 4 and 5. The clamp 18 is in the form of an insulation-piercing contact, that is to say, it has two flanks or cutting edges 19, 20 that converge with increasing depth. The two flanks or cutting edges have a sharp edge for at least a part of their extent. A winding end 21, which is introduced through a slot 22 in the socket 11 into the insulation-piercing contact 18 engages first of all the sharp-edged regions of the flanks 19, 20. These remove the insulation of the winding end 21, so that the core of the enamelled wire, from which the windings 5 are formed, comes into contact with the insulation-piercing contact 18. The flanks 19, 20 are arranged at a (predetermined) minimum distance from one another, however, so that the core of the winding end 21 is not cut right through.

In the socket 11 there is provided a short-circuiting link 16, which is in connection with the insulation-piercing contact 18 by way of a spring contact 23. As is apparent from FIG. 1, the short-circuiting link 16 produces a short circuit between three adjacent clamps 18. In this context, for example, the winding end of the main winding is arranged in the clamp arranged furthest to the left, the winding end of the auxiliary winding is arranged in the clamp lying to the right of that, and a terminal of the motor protection device 15 is arranged in the clamp lying to the right of that. The exact sequence is not important however. The motor protection device in its turn is connected by way of the middle contact in the socket 10 to the middle one of the three flexible leads 13 (see also FIG. 3). The two outer leads of the three flexible leads 13 are connected by way of two outer clamps 10 NOTE to the two outer terminals of the main and auxiliary winding.

The short-circuiting link 16 is connected in one piece with the retaining arm 17. This ensures that the machine is ready for operation only when the motor protection device 15 is pressed against the windings 5. If the short-circuiting link 16 is not used, the contact pressure is no longer applied, but there is no connection by way of the short-circuiting link 16 between the winding ends of the main and auxiliary winding and the middle of the three flexible leads 13, so that no current is able to flow.

For manufacture, after completion of the windings 5 with the winding heads 6, 7, the respective winding end can be inserted in a very simple manner from above into the slot 22. When it is pulled down, it automatically comes into electrical contact with the insulation-piercing contact 18. The protruding end can be shortened as appropriate. This procedure is required for all winding ends and the two terminals of the motor protection device 15. After that, all that is required is to insert the short-circuiting link 16 and the stator 1 is practically ready for operation.

In the embodiment shown in FIGS. 2 and 3, parts that correspond to those of FIG. 1 have been given reference numbers increased by 100.

Unlike the embodiment shown in FIG. 1, the end plate 108 does not cover all slots 103, but only approximately more than half, namely 14 of 24 slots or about 58% of the slots. The end plate is essentially in the form of a U with two substantially parallel arms 40, 41 and a base 42, the arms 40, 41 being joined to the base 42 by way of areas of reduced section 43, 44. In this embodiment the windings 105 can be introduced into the laminated core 102 and the winding heads 106, 107 can be fabricated and taped before the end plate 108 is put into position. To put it into place, the two arms 40, 41 are bent outwards. The end plate 108 is then pushed forwards parallel to the breadth of the base 42 towards the winding 105 until the base engages the winding 105. In this connection, the end plate 108 is formed in such a manner that it covers at least some teeth 45 between slots 103 or at least partially covers them. The end plate 108 thus engages in this region between individual strands of the windings 105. The end plate 108 is by that means prevented from moving parallel to the breadth of the base 42. As soon as the base 42 has come into contact with the windings 105, the arms 40, 41 are released. Because of the resilience of the areas of reduced section 43, 44, the arms 40, 41 spring inwards and also come into contact with the windings 105. The two arms 40, 41 have, like the base 42, projections 46, 47 which in the end state, that is to say, after assembly, engage between individual slots and thus between individual strands of the windings 105. This prevents the end plate 10 from being removed at right angles to the breadth of the base 42 from the stator 101. The possibility of moving at right angles to the plane of the laminations forming the laminated core 102 is prevented by the end plate 108 engaging beneath the winding ends 106, 107, as is clear from FIG. 2.

we claim:

1. An electrical machine, comprising a laminated core having winding slots and frontal faces, at least one winding extending at least in part in said slots and having winding heads and winding ends, electrical connecting wires having ends, each winding end being of an elongated length, an electrically insulating end plate adjacent to each core frontal face and a winding head, and a connecting box joined to one of the end plates and having the electrical connecting wires and winding ends extended therein, the connecting box having a clamp for each winding end to receive the respective end after the introduction of the winding end into the connecting box, each clamp having insulation-piercing contacts, the insulation-piercing contacts comprising two cutting edges that converge with increasing depth for contacting the winding end.

2. A machine according to claim 1, characterized in that the connecting box has two sockets, one of the sockets being a plug receiving socket.

3. A machine according to claim 1, characterized in that the end plates enclose all of the slots of the laminated core.

4. A machine according to claim 1, characterized in that there is provided a motor protection device, and a retaining arm adjacent to the connecting box for holding the motor protection device in thermal contact with at least one of the laminated core and the winding.

5. A machine according to claim 1, wherein the winding end is of an elongated length, characterized in that the connecting box has at least one slot like opening for having a winding end extending thereinto at right angles to its length.

6. A machine according to claim 1, characterized in that the end plates enclose some of laminated core slots.

7. A machine according to claim 6, characterized in that the end plates have means for snap locking to the winding heads.

8. A machine according to claim 6, characterized in that the end plates are substantially U-shape and have two substantially parallel arms and a base joining the arms, each end plate having reduced area sections between its arms and the base.

9. A machine according to claim 1, characterized in that there is provided a motor protection device located between the connecting box and the adjacent winding head and a retaining arm for holding the motor protection device in thermal contact with one of the laminated core and the winding.

10. A machine according to claim 9, characterized in that the motor protection device has a terminal, that the connecting box has a separate clamp for the winding end and the terminal, and a short-circuiting link for connecting the clamps to one another.

11. a machine according to claim 10, characterized in that each winding has a terminal connected to the short-circuiting link.

12. A machine according to claim 10, characterized in that the short-circuiting link and the retaining arm are a single part.

13. An electrical machine, comprising a laminated core having winding slots and frontal faces, a winding extending at least in part in said slots and having winding heads and winding ends, electrical connecting wires having ends, an electrically insulating end plate adjacent to each core frontal face and a winding head, a connecting box integrally joined to the end plate and having the electrical connecting wires and the winding end extended therein, a motor protection device between box and one of the winding and the laminated core and having a terminal, the connecting box having a first clamp for engaging the winding end and a second clamp for the motor protection device terminal, a retaining arm for holding the motor protection device against at least one of the winding and the laminated core, said retaining arm extending into the connecting box, and a short circuiting link providing a short circuit between the first and second clamps, the short circuiting link being connected to the retaining arm.

14. An electrical machine according to claim 13 wherein the first clamp includes two cutting edges that converge in with increasing depth.

* * * * *